US008671201B2

(12) United States Patent
Keller et al.

(10) Patent No.: US 8,671,201 B2
(45) Date of Patent: Mar. 11, 2014

(54) CORRELATION OF SESSIONS IN CASE OF SESSION TRANSFER IN IMS DOMAIN

(75) Inventors: Ralf Keller, Würselen (DE); Alf Heidermark, Saltsjöbaden (SE); Fredrik Lindholm, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 256 days.

(21) Appl. No.: 13/126,902

(22) PCT Filed: Sep. 29, 2008

(86) PCT No.: PCT/EP2008/008265
§ 371 (c)(1),
(2), (4) Date: Jun. 14, 2011

(87) PCT Pub. No.: WO2010/034332
PCT Pub. Date: Apr. 1, 2010

(65) Prior Publication Data
US 2011/0238845 A1   Sep. 29, 2011

(51) Int. Cl.
*G06F 15/16* (2006.01)
(52) U.S. Cl.
USPC .......................... 709/227; 709/200; 370/352
(58) Field of Classification Search
USPC .................... 709/200, 227; 370/352
See application file for complete search history.

(56) References Cited

U.S. PATENT DOCUMENTS

| 7,418,511 | B2* | 8/2008 | Takechi et al. ............ 709/229 |
| 2002/0062379 | A1* | 5/2002 | Widegren et al. ............ 709/227 |
| 2007/0153769 | A1* | 7/2007 | Comstock et al. ............ 370/352 |
| 2007/0233869 | A1* | 10/2007 | Jodh et al. ............ 709/226 |
| 2007/0263828 | A1* | 11/2007 | Lee et al. ............ 379/212.01 |
| 2008/0299958 | A1* | 12/2008 | Buckley et al. ............ 455/417 |
| 2009/0067408 | A1* | 3/2009 | Leppainen et al. ............ 370/350 |
| 2009/0131022 | A1* | 5/2009 | Buckley et al. ............ 455/412.1 |
| 2009/0303909 | A1* | 12/2009 | Farhoudi et al. ............ 370/312 |
| 2011/0058520 | A1* | 3/2011 | Keller et al. ............ 370/328 |

OTHER PUBLICATIONS

3rd Generation Partnership Project. 3GPP TS 23.216, V1.1.0 (Apr. 2008). 3rd Generation Partnership Project; Technical Specification Group Services and System Aspects; Single Radio Voice Call Continuity (SRVCC); Stage 2 (Release 8), Apr. 2008.
3rd Generation Partnership Project. "Replacing VDN with STN-SR and Other Correction in 3GPP TS 23.216." 3GPP TSG-SA WG2 Meeting #67, S2-086340, Sophia Antipolis, France, Aug. 25-29, 2008.
3rd Generation Partnership Project. "SR-VCC with Shared IMPU." 3GPP TSG SA WG2 Meeting #67, TD S2-085649, Sophia Antipolis, France, Aug. 25-29, 2008.

(Continued)

*Primary Examiner* — Anthony Mejia
(74) *Attorney, Agent, or Firm* — Coats and Bennett PLLC

(57) ABSTRACT

The invention relates to session control in an IMS domain of a communications network and more particularly to techniques for performing session transfer in an IMS control node (SCC AS) for controlling centralized services in an IMS domain. One embodiment of an SCC AS (200) may be adapted to store, for each of a plurality of ongoing communication sessions, a session information item (218) comprising a user identity (222) identifying a user device involved in the session and a first identifier (216) of the user device in a CS domain of the communications network, wherein the user identity is associated with multiple user devices and the first identifier comprises at least one of an MSISDN (216), an IMSI, and a GRUU.

19 Claims, 12 Drawing Sheets

(56) References Cited

OTHER PUBLICATIONS

3rd Generation Partnership Project. "Clarification that GRUU Should be Used—None 11 Flows." 3GPP TSG SA WG2 Meeting #65, TD S2-083802, Prague, Czech Republic, May 12-16, 2008.

3rd Generation Partnership Project. S2-083653 Cleanup of 23.292, V0.4.0. 3rd Generation Partnership Project; Technical Specification Group Services and System Aspects; IP Multimedia Subsystem (IMS) Centralized Services; Stage 2 (Release 8), Apr. 2008.

* cited by examiner

CORRELATION OF SESSIONS IN CASE OF SESSION TRANSFER IN IMS DOMAIN

TECHNICAL FIELD

The invention relates to session control in an IMS domain of a communications network. More particularly, the invention relates to techniques for performing session transfer in the IMS control node SCC AS for controlling centralized services and service continuity in an IMS domain.

BACKGROUND

The IMS (IP Multimedia Subsystem) domain is part of mobile communications networks as standardized by the 3GPP ($3^{rd}$ Generation Partnership Project). Other domains are the CS (Circuit Switched) and PS (Packet Switched) domains. IMS based services may be provided using PS bearers or CS bearers for the media.

IMS Centralized Services (ICS) are defined in the 3GPP TS (Technical Specification) 23.292 for providing communication services based on IMS mechanisms while using CS access for the media bearer. For example, ICS provides mechanisms to support the use of a CS media bearer for an IMS (multimedia) session and defines signalling mechanisms between the UE (User Equipment) and IMS for supporting service centralization when using a CS access. ICS thus allows IMS user sessions based on CS bearers to be treated as standard IMS sessions for the purpose of service control and service continuity.

IMS Service Continuity is a service of IMS which supports the use of session transfer mechanisms to maintain service continuity in the event of terminal mobility and/or mobility between terminals in case such an event is not hidden from the IMS session layer (as, e.g., in case of mobility between CS accesses) and thus service continuity could not otherwise be maintained. Session transfer mechanisms support a transfer at the IMS-level of one or more of the session signalling paths and/or associated media paths of an ongoing IMS session while maintaining session continuity. Session Transfer incorporates at least one of access transfer and inter-UE transfer.

Both IMS Centralized Services and IMS Service Continuity are provided by a SIP (Session Initiation Protocol) application server in IMS termed SCC AS (Service Centralization and Continuity Application Server) as described in TS 23.292 and 23.237.

Session transfer procedures are initiated by the UE and are executed and controlled by the SCC AS. When the UE determines that access transfer is desirable and possible, a registration in IMS is performed by the UE via the transferring-in access network if possible and if the UE has not already registered itself via the transferring-in access network. A new access leg is established by the UE towards the SCC AS. Signalling and bearer resources are allocated in the transferring-in access network and the user's sessions are transferred from the transferring-out access network. The SCC AS executes access transfer procedures. Eventually resources in the transferring-out access network are released.

Additionally, SRVCC (Single Radio Voice Call Continuity) mechanisms for session transfer from an E-UTRAN (Evolved UMTS Radio Access Network) to CS are specified in the TS 23.216 for CS calls that are anchored in IMS.

With regard to session transfer, the SCC AS has to correlate an incoming session transfer request with an existing session. However, in IMS a user can have a (public) user identity shared among several sessions/devices such that the called party is presented with one and the same identity although using, e.g., different devices. Thus, the user may own multiple sessions based on the same identity. In case of several sessions from one and the same UE, it is common understanding in the competent 3GPP Service Architecture Workgroup to identify the last established active session with speech media as the session to be transferred. In case of several sessions sharing the same public user identity and related to different UEs, there is no common understanding on how to identify in the SCC AS the user device/session to be transferred.

SUMMARY

There is a demand for a technique for supporting session control in an IMS domain of a communications network which enables an SCC AS control node for controlling centralized services in the IMS domain to determine the session to be transferred in case of a shared user identity.

This demand is satisfied by a method for supporting session control in an IMS domain of a communications network. The method is performed in a control node for controlling centralized services and service continuity in the IMS domain and comprises the steps of storing, for each of a plurality of ongoing communication sessions, a session information item comprising a user identity for a user device involved in the session and a first identifier identifying the user device in a CS domain of the communications network, wherein the user identity is associated with multiple user devices and the first identifier comprises at least one of an MSISDN, an IMSI, and a GRUU; receiving a session transfer request, wherein the session transfer request comprises a second identifier identifying a user device in the CS domain and the second identifier comprises at least one of an MSISDN, an IMSI, and a GRUU; comparing the received second identifier or a third identifier determined based on the second identifier with the stored plurality of first identifiers; and identifying, based on the comparison, a particular ongoing session related to the requested session transfer.

In a CS network, an MSISDN (Mobile Subscriber ISDN Number) is the publicly known number uniquely identifying a subscription. An IMSI (International Mobile Subscriber Identity) is also a unique number which is associated with a device as it is stored on the (U)SIM (Subscriber Identity Module) inside the user device. The MSISDN is the number normally dialled to connect a call to the mobile phone (UE, user device), while the IMSI is often used as a key in subscriber databases such as the HLR (Home Location Register) or HSS (Home Subscriber Register). As in a CS network the MSISDN is used to connect a call and the IMSI is SIM-based, from a CS point of view the MSISDN and IMSI cannot be shared between simultaneously used devices. In a network comprising IMS domain and CS domain and in which services are centralized in IMS, multiple user devices may share an IMS user identity (user id). However, still each CS capable device requires a unique MSISDN for connecting the device in the CS domain; this number is therefore also referred to as the "CS MSISDN" herein. The IMSI is also a unique number.

A GRUU (Globally Routable Unique User id) is an identifier which routes to a specific instance. The GRUU is normally based on an InstanceID. In some implementations the GRUU only contains the InstanceID. As used herein, the term 'GRUU' is to be understood as including the InstanceID as one concrete example or option for an implementation of a GRUU.

The control node for controlling centralized services in the IMS domain may be an SCC AS. The session transfer request may be received from a control node for CS access control in the CS domain, for example an MSC server. In some of these implementations, the session transfer request is processed to extract at least one of MSISDN, IMSI and GRUU based on the determination that the session transfer request is received from the control node for CS access control in the CS domain, e.g. any session transfer request received from an MSC server is processed to extract at least one of MSISDN, IMSI or GRUU. In these variants, the MSISDN, IMSI or GRUU may generally be included when sending a session transfer request via an A/Iu interface (i.e. CS access) or S1-MME interface (i.e. E-UTRAN access). The SCC AS may then be adapted to extract the MSISDN, IMSI or GRUU from any session transfer request received via an ISC interface.

While generally a Serving CSCF or similar call control node in the IMS domain will be required to forward the session transfer request from an MSC server toward an SCC AS, the CSCF is not needed to perform any actions or processing regarding the second identifier, such as retrieving, determining, changing or entering the second identifier or indications thereof into the request. In other words, at least the second identifier in the session transfer request may be transparently forwarded by a call control node, for example a CSCF, in the IMS domain to the SCC AS.

Any of the above-outlined methods may comprise the initial step of retrieving, triggered by a session initiation, from a subscriber register the first identifier for storing in the session table. The subscriber register may for example be one of HSS and HLR in the communications network. In this way, there is no need for the user device to know and transmit its MSISDN or IMSI or a GRUU.

The identification step may comprise selecting one of a plurality of multiple session information items associated with the same first identifier, that selection being based on at least one of selecting the most recently established session and selecting a session that includes transport of speech.

The third identifier may be retrieved from a subscriber register based on the second identifier. In one implementation, the second identifier comprises one of IMSI or GRUU and the third identifier comprises an MSISDN, which may for example be retrieved from an HSS based on the IMSI or GRUU.

The method may comprise the step of receiving an indication which of MSISDN, IMSI, and GRUU is to be used for the identification of the session to be transferred. This indication may, for example, be received during registration from the user device or an MSC server.

The identification step may comprise determining a session number for a session for which the second or third identifier matches with the first identifier. A representation of the session number may, for example, be a session identifier as known in IMS.

The above-mentioned demand is further satisfied by a method for supporting session control in an IMS domain of a communications network. The method is performed in a control node for CS access control in a CS domain of the communications network, for example an MSC server. The method comprises the steps of preparing a session transfer request comprising an identifier identifying a user device in the CS domain, wherein the identifier comprises at least one of an MSISDN, an IMSI, and a GRUU; and sending the session transfer request to a control node for controlling centralized services in the IMS domain.

The CS access control node may be adapted to include an MSISDN in any session transfer request transmitted over an I2 interface. In this way use of other identifiers can generally be avoided when sending a session transfer request. For example, the use of an InstanceID or GRUU (Globally Routable Unique User id) is not needed in the MSC server.

Some implementations of this method comprise the prior step of receiving a relocation request including the identifier from a mobility management entity. For example, an MSISDN may be received from an MME in an evolved packet core network (LTE network). Further processing such as retrieval of the identifier from a subscriber register can be avoided in this way.

The above demand is satisfied by a still further method for supporting session control in an IMS domain of a communications network. This method is performed in a control node for mobility management in an packet core network of the communications network, for example in an MME in an LTE (Long Term Evolution) network. The method comprises the steps of receiving, from a user device, an identifier identifying the user device in a CS domain of the communications network, wherein the identifier comprises at least one of an MSISDN, an IMSI, and a GRUU; and including the received identifier in a re-location request to a control node for CS access control in the CS domain.

Further, the abovementioned demand is satisfied by a computer program product, which comprises program code portions for performing the steps of one or more of the methods and method aspects described herein when the computer program product is executed on one or more computing devices, for example an SCC AS, MSC server or MME. The computer program product may be stored on a computer readable recording medium, such as a permanent or re-writeable memory within or associated with a computing device or a removable CD-ROM, DVD or USB-stick. Additionally or alternatively, the computer program product may be provided for download to a computing device, for example via a data network such as the Internet or a communication line such as a telephone line or wireless link.

Further, the abovementioned demand is satisfied by a control node for controlling centralized services in an IMS domain of a communications network, such as an SCC AS. The control node is adapted to support session control and service continuity in the IMS domain. The control node comprises a component adapted to store, for each of a plurality of ongoing communication sessions, a session information item comprising a user identity for a user device involved in the session and a first identifier identifying the user device in a CS domain of the communications network, wherein the user identity is associated with multiple user devices participating in multiple sessions and the first identifier comprises at least one of an MSISDN, an IMSI, and a GRUU; a component adapted to receive a session transfer request, wherein the session transfer request comprises a second identifier identifying a user device in the CS domain and the second identifier comprises at least one of an MSISDN, an IMSI, and a GRUU; a component adapted to compare the received second identifier or a third identifier determined based on the second identifier with the stored plurality of first identifiers; and a component adapted to identify, based on the comparison, a particular ongoing session related to the requested session transfer.

The demand given above is also satisfied by a control node for CS access control in a CS domain of a communications network, for example an MSC server. The control node is adapted to support session control in an IMS domain of the communications network. The control node comprises a component adapted to prepare a session transfer request comprising an identifier identifying a user device in the CS domain, wherein the identifier comprises at least one of an MSISDN, an IMSI, and a GRUU; and a component adapted to send the session transfer request to a control node for controlling centralized services in the IMS domain.

The above-described demand is moreover satisfied by a control node for mobility management in an evolved packet core network of a communications network, for example an MME in an LTE network. The control node is adapted to support session control in an IMS domain of the communications network. The control node comprises a component adapted to receive, from a user device, an identifier identifying the user device in a CS domain of the communications network, wherein the identifier comprises at least one of an MSISDN, an IMSI, and a GRUU; and a component adapted to include the received identifier in a re-location request to a control node for CS access control in the CS domain.

Still further, the above-mentioned demand is satisfied by a communications network comprising a first control node for controlling centralized services and service continuity in an IMS domain of the communications network according to claim 15 and a second control node for CS access control in a CS domain of the communications network according to claim 16, wherein the network is configured such that in case the session transfer request is transmitted from the user device via an I1 or Gm interface to the first control node, the GRUU is transmitted as the second identifier in the session transfer request; and in case the session transfer request is transmitted from the second control node via an I2 interface to the first control node, the MSISDN is transmitted as the second identifier in the session transfer request.

BRIEF DESCRIPTION OF THE DRAWINGS

In the following, the invention will further be described with reference to exemplary embodiments illustrated in the figures, in which.

DETAILED DESCRIPTION OF PREFERRED EMBODIMENTS

In the following description, for purposes of explanation and not limitation, specific details are set forth, such as a communications system including an SCC AS and an MSC server, in order to provide a thorough understanding of the current invention. It will be apparent to one skilled in the art that the current invention may be practiced in embodiments that depart from these specific aspects. For example, the skilled artisan will appreciate that the current invention may be practised in communication networks in which the functionalities assigned to the SCC AS, MSC server, MME, etc. are assigned to other nodes or functional entities which may be named differently. This may include implementing these functionalities not on one hardware node or within a functional entity but on multiple nodes/entities.

Those skilled in the art will further appreciate that functions explained hereinbelow may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the current invention is described as a method, it may also be embodied in a computer processor and a memory coupled to the processor, wherein the memory is encoded with one or more programs that perform the methods disclosed herein when executed by the processor.

Figure 1:
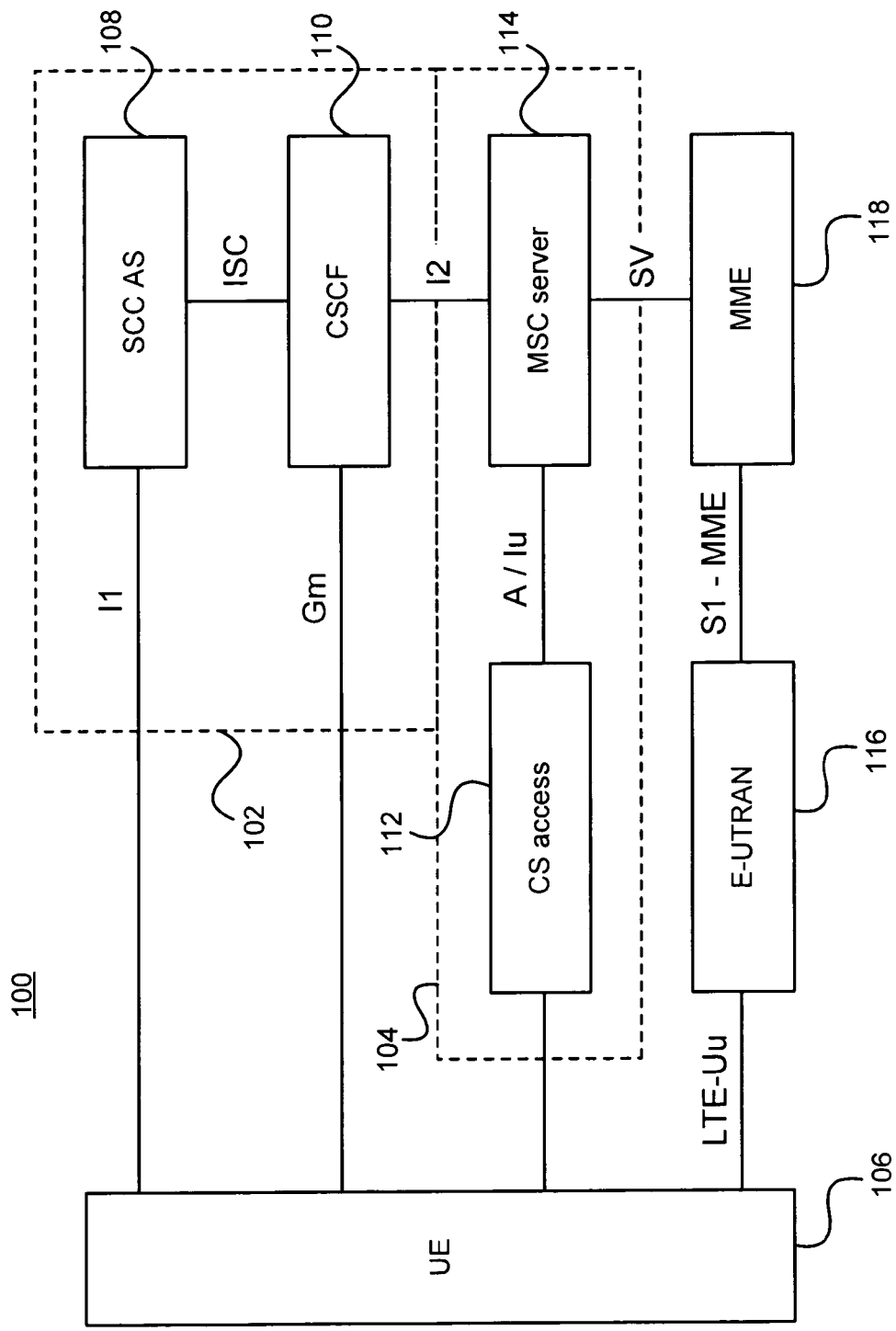
FIG. 1 schematically illustrates an embodiment of a communications network.

FIG. 1 schematically illustrates an embodiment of a communications network 100 including an IMS domain 102 and a CS domain 104. For purposes of illustration, various possibilities are indicated of how a user device (UE) 106 may communicate with an SCC AS for the control of centralized services in the IMS domain 102. The user device 106 may communicate directly via the interface (or reference point) I1 with the SCC AS 108 or via a Gm interface and a CSCF (Call State Control Function) 110 in the IMS domain 102. In case the user terminal 106 is CS capable, it may also communicate via CS access 112 and an A or Iu interface with an MSC server 114 in the CS domain 104. The MSC server then has to forward, e.g., a session transfer request originating from the user device 106 via CSCF 110 towards the SCC AS 108. In case the communications network 100 also comprises an E-UTRAN 116, the terminal 106 may also connect via LTE-Uu and S1-MME interfaces and MME 118 to the MSC server 114.

The subsequent discussion will mostly focus on the communication (session control signalling) between user terminal 106 and MSC server via A/Iu interface or via MME. For example, in case the I1 or Gm interface is available in a communications network, an Instance ID/GRUU may be signalled from an I1/Gm capable user device to the SCC AS. However, usage of Instance ID/GRUU is not proposed herein for the signalling paths over the MSC server.

When the terminal 106 wants to change its access due to mobility reasons, in many configurations service continuity can be provided below the IMS layer. For example, in case the terminal 106 changes from CS access to another CS access, this will normally be handled in the CS domain. Also, a PS-PS access change may be handled without involvement of the IMS. The case that the terminal 106 wants to change from CS access to PS access typically does not pose problems in the SCC AS, as no routing in the CS domain will be required. Regarding the change from PS access to CS access, for example an InstanceID or GRUU (or CS MSISDN) may be signalled via the I1 or Gm interface as illustrated in FIG. 1 in order to enable the SCC AS to identify the session to be transferred. Generally, over the I1 interface dynamic STIs (Session Transfer Identifiers) may be used.

In case the I1 or Gm interface is not available or cannot be used by the terminal 106 for some other reason, in the dual radio case (in which the terminal is enabled to communicate with both the transferring-out and the transferring-in access network) the terminal 106 may use the A/Iu interface and the MSC server 114 is required to send a session transfer request towards the SCC AS 108. In case the MSC server is enhanced for ICS (cf. TS 23.292, Section 4.6.2), the MSC server 114 may use an InstanceID or GRUU. In case the MSC server is not enhanced for ICS, the MSC is not adapted to include the InstanceID or GRUU in the session transfer request. However, independent of whether or not the MSC server is enhanced for ICS, the MSC server may include the MSISDN of the terminal 106 as used in the CS domain 104 in the session transfer request (in case the MSC server is not enhanced for ICS, this requires CAMEL).

In the single radio case (i.e., the terminal device is capable of transmitting/receiving in only one of the transferring-out and transferring-in access networks at a time), the SRVCC mechanism is defined in the TS 23.216 for changing from PS access to CS access. Independent of whether or not the MSC server is enhanced for ICS, it appears appropriate not to use the InstanceID/GRUU as a user device or session indication to the SCC AS, as this would require an additional mechanism for forwarding the InstanceID from the MME towards the MSC server. Also, CAMEL phase 4 is required in case the MSC server is not enhanced for ICS. It is proposed to use the CS-MSISDN instead, which might require that the user device is CS attached.

It is proposed herein to provide in some embodiments the "CS MSISDN", i.e. the MSISDN as used as a device identity of a user device in a CS domain, to the SCC AS in order to enable this node to identify, amongst multiple sessions related to one and the same IMS user identity, the particular session to be transferred in response to a session transfer request. The CS MSISDN (or an indication thereof) may be used as an indication of user device/session over the CS access and A/Iu interface, or over the E-UTRAN and MME (in other embodiments, the CS MSISDN may also be used as a device/session identifier over the I1 and/or Gm interface). In one embodiment, the CS-MSISDN is always used over the A/Iu and S1-MME interface, independently of whether or not other user device/session indicators such as InstanceID or GRUU are available. In other embodiments, when different techniques are used over the different interfaces or one and the same interface, an indication of the applied technique (e.g., based upon either CS MSISDN or InstanceID/GRUU) may be indicated or may be agreed upon on registration.

Similar considerations hold for using the IMSI as an identifier of a user device in a CS domain in an SCC AS, as will become clear by the subsequently described embodiments.

Figure 2:
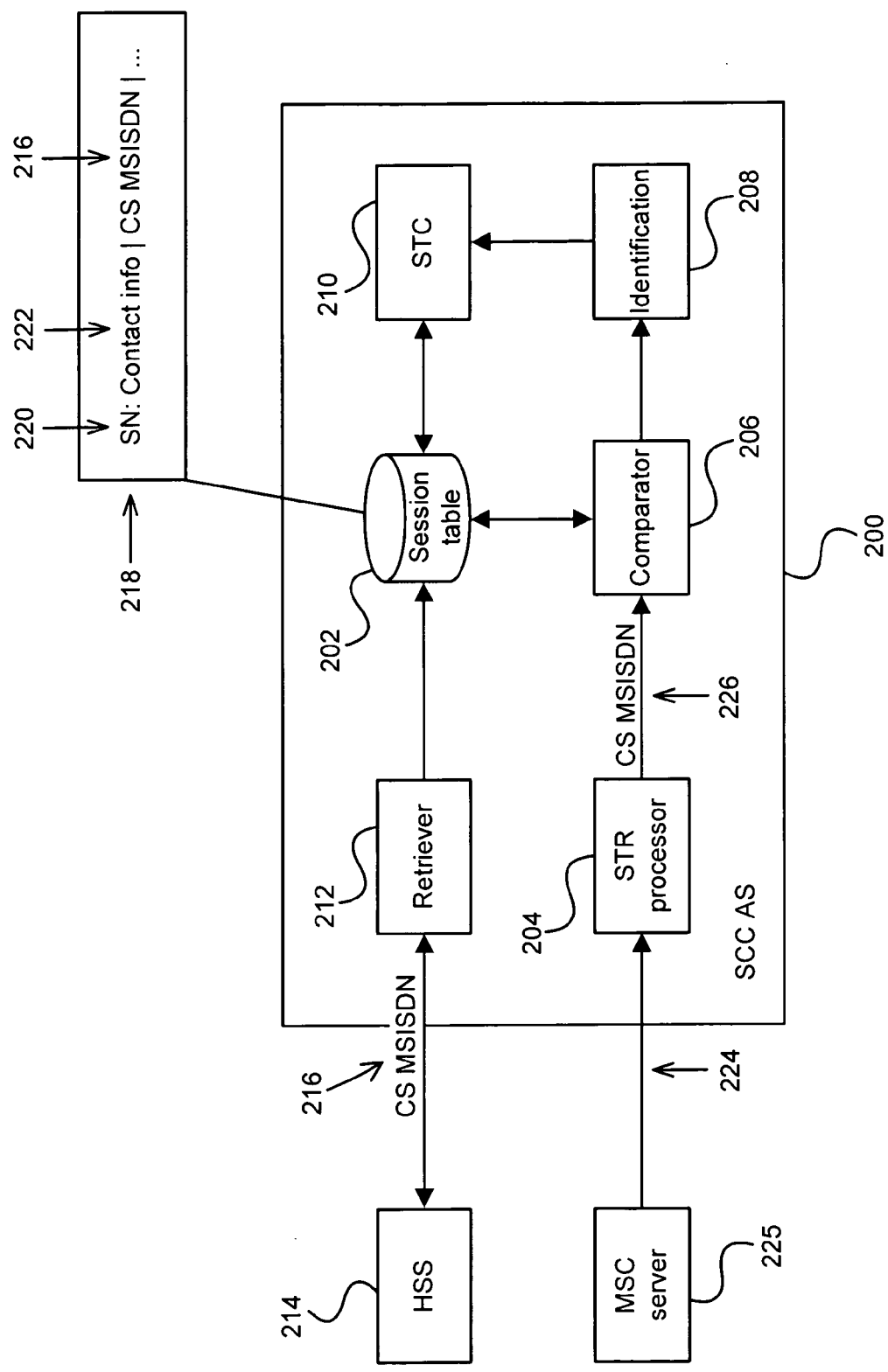
FIG. 2 illustrates functional components of a first embodiment of the SCC AS of FIG. 1.

FIG. 2 schematically illustrates functional components of an embodiment 200 of the SCC AS 108 of FIG. 1. The SCC AS 200 comprises a session table 202, an STR (Session Transfer Request) processor 204, a comparator 206, an identification component 208, an STC (Session Transfer Controller) 210, and a retriever 212.

An operation of the SCC AS 200 will now be described taking the overall configuration of FIG. 1 as a basis and with reference to the flow diagram of FIG. 3. Generally, the operation of the SCC AS 200 relates to supporting a session control in IMS. In step 302, the retriever component 212 retrieves from a HSS 214 the MSISDN as used in the CS domain 104 as an identification of the user device 106 (used, e.g., for routing calls towards the user device 106 in the CS domain 104), i.e. the CS MSISDN 216. The retrieval may be triggered by a registration of the user device 106.

The retrieval may be performed using the IMS user identity such as the IMPU (IP Multimedia Public User ID) or, the retrieving component 212 may use for retrieval the temporary IMPU provided to the SCC AS 200 during registration. The CS MSISDN may be available in the HSS 214 as an additional, separate IMPU. The option to have the SCC AS retrieve the CS MSISDN from an HSS may be preferred in case a user device does not know its CS MSISDN.

Generally, a user device may be related to multiple public user IDs (user identities) in the HSS. For example, the user may have a first IMPU ("IMPU1"), which is shared amongst several user devices. A temporary IMPU, conventionally termed T-IMPU, derived from the first IMPU may also be stored in the HSS. Further, the user device 106 may have a second IMPU ("IMPU2") which is based on the CS MSISDN for a particular user device. A registration with the IMPU2 is not required (the IMPU2 could even be barred in IMS). In case the user device is registered with IMPU1 in IMS, the SCC AS can then retrieve the IMPU2, i.e. the CS MSISDN, from the HSS by, e.g., using the T-IMPU. Additionally or alternatively, the user device or MSC server may be adapted to provide an IMPU based on the CS MSISDN to the SCC AS.

In a different embodiment, instead of retrieving the CS MSISDN from an HSS, the CS MSISDN may be provided to the SCC AS during registration of an MSC server at the SCC AS.

In step 304, the retrieved CS MSISDN 216 is provided to the session table 202. This table maintains session information for each ongoing communication session. The session information for a session may comprise an entry such as that schematically indicated as entry 218 in FIG. 2. In particular, in association to a session number 220 (e.g., an IMS session identifier), a user identity for a user device involved in the session may be stored, which in the example of FIG. 2 comprises a SIP contact information 222. The contact information 222 may for example comprise the IMPU (or T-IMPU) used for retrieving the CS MSISDN from the HSS 214 in step 302. Further, the session information comprises the CS MSISDN 216 as retrieved from the HSS 214. For the case that a user terminal may be capable of maintaining multiple sessions, additional information may be stored in the table 202, for example, concerning the active/held state of the session or time information, which allows to decide, which of multiple sessions with the same CS-MSISDN to transfer in response to a session transfer request.

In step 306, the STR processor 204 receives a session transfer request 224 from an MSC server 225 which is an embodiment of the MSC server 114 of FIG. 1 adapted for including a CS MSISDN in session transfer requests transmitted towards the SCC As 200. The session transfer request 224 may be transported using different protocols. For example, in case the MSC server 114 is SIP enabled, the STR 224 may be transported using a SIP INVITE message. As another possibility, the MSC server 225 may use an ISUP IAM message for transferring the STR.

The processor 204 is adapted to extract the CS MSISDN 226 from the received session transfer request 224. In step 308, the comparator 206 operates to compare the received CS MSISDN 226 with CS MSISDN numbers such as CS MSISDN 216 in the session table 202. The comparison is controlled by the identification component 208, which operates in step 310 to identify, based on the comparison performed by the component 206, the particular session from the ongoing sessions tabulated in session table 202 which is related to the session transfer request 224. Specifically, the identification component 208 may operate to compare the received CS MSISDN 226 to any of the CS MSISDN numbers stored in the session table 202 and to identify for matching CS MSISDN numbers the session numbers SN associated therewith.

It is to be noted that there may be several entries in session table 202 having the same CS MSISDN, for example in case the user device 106 is capable of supporting multiple (CS based) sessions. In this case, the identification component 208 requires decision logic to decide which of these sessions is requested to be transferred. The decision may comprise, for example, to select the most recently established session. A further decision criterion may comprise to select that session which relates to the transport of speech as opposed to the transport of other kinds of media data.

In step 312, the identification component 208 provides an indication of the identified session, for example the session number SN of the matching entry, to the STC 210. The STC 210 then executes a session transfer for the indicated session as requested by the session transfer request 224.

The SCC AS 200 may be configured to process any STR message (such as STR 224) received from an MSC server in the way as has been described above. The STR processor 204 can be implemented as expecting a CS MSISDN in any STR arriving from an MSC server. For example, the STR processor may be configured to expect a CS MSISDN based solely on the determination that the STR is received from an MSC server. In this case, the STR 224 need not be analysed for the occurrence of any other identifier such as InstanceID or GRUU, which simplifies a processing in the SCC AS.

The STR 224 is illustrated in FIG. 2 as being received from the MSC server 226. In particular, the STR message 224 may be forwarded transparently by the serving CSCF 110 (cf. FIG. 1): After the CS MSISDN has been included into the session transfer request by the MSC server 114, there is no need that the CSCF 110 is involved in any processing regarding the CS MSISDN in the STR 224.

Figure 4:
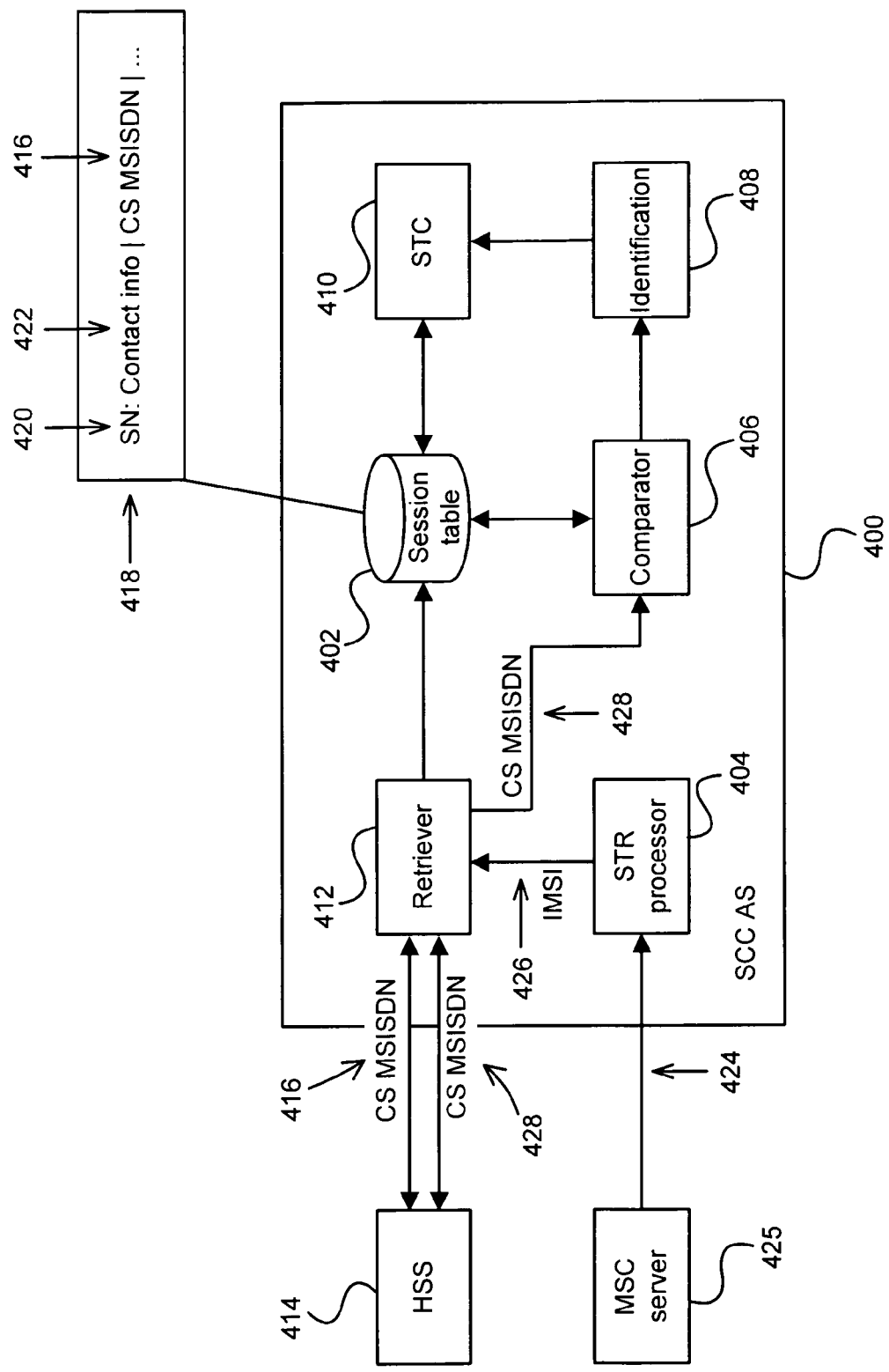
FIG. 4 illustrates functional components of a second embodiment of the SCC AS of FIG. 1.

FIG. 4 schematically illustrates functional components of a second embodiment 400 of the SCC AS 108 of FIG. 1. The SCC AS 400 comprises a session table 402, an STR processor 404, a comparator 406, an identifier 408, an STC 410, and a retriever 412.

An operation of the SCC AS 400 is described with reference to the flow diagram of FIG. 5. The configuration of the communications network 100 of FIG. 1 will be taken as an overall environment. As some of the functionalities of the SCC AS 400 may be similar to those of the SCC AS 200 of FIG. 2, the following description focuses on the differences in operation between these two embodiments. Any aspect regarding the SCC AS 400 which is not explicitly described below may be understood as covered by the corresponding aspect described for the SCC AS 200.

Figure 3:
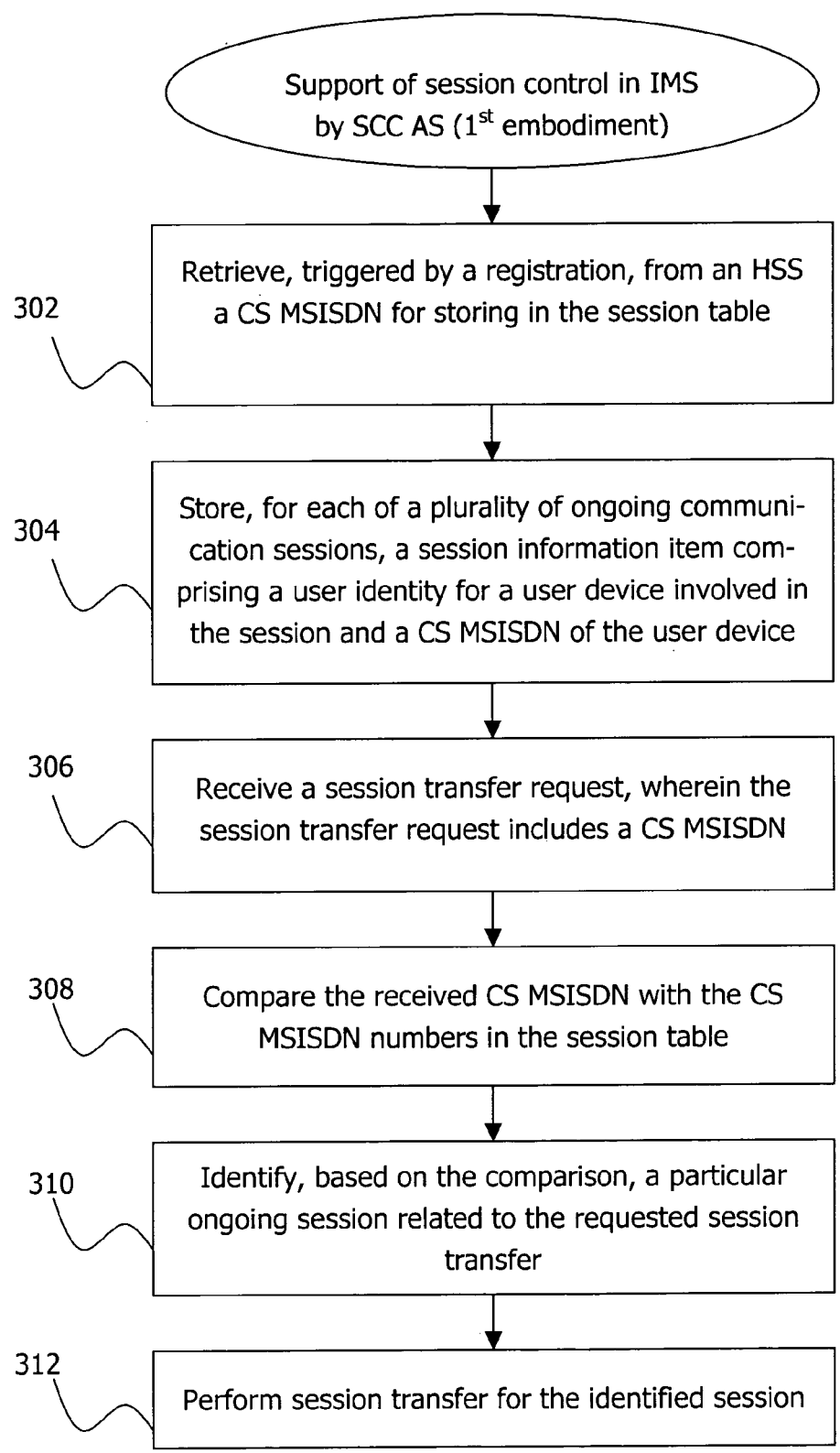
FIG. 3 is a flow diagram illustrating an operation of the SCC AS of FIG. 2.
Figure 5:
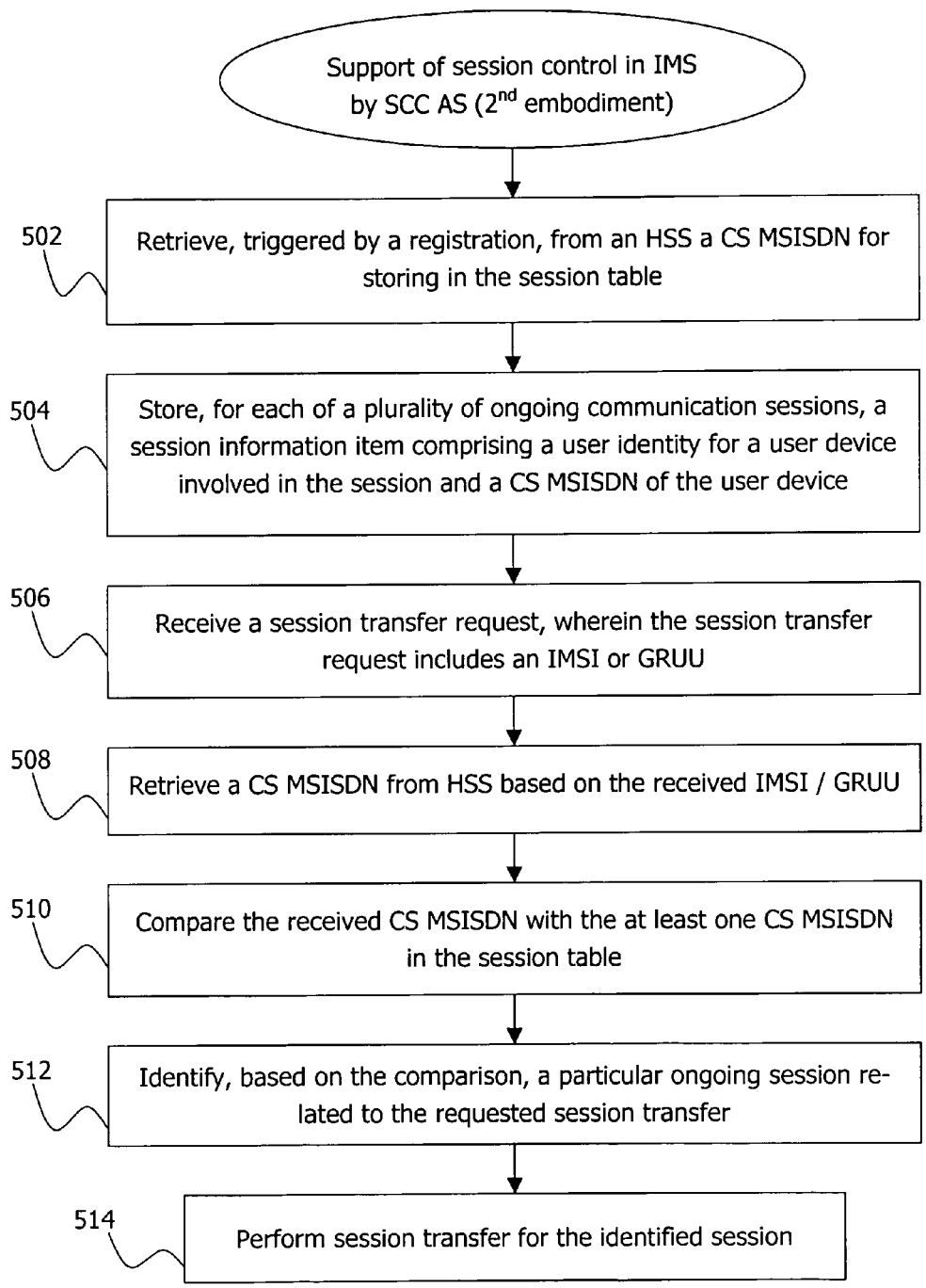
FIG. 5 is a flow diagram illustrating an operation of the SCC AS of FIG. 4.

Referring to FIG. 5, the steps 502 and 504 are similar to the steps 302 and 304 of FIG. 3, i.e. the retrieving component 412 retrieves from a HSS 414 a CS MSISDN 416 for storage in session table 402 for at least those CS based sessions which are related to one and the same IMS user (e.g., same IMPU in contact information). Similar to session table 202, the session table 402 may contain for each session an entry 418 including, in association with a session number (SN) 420 contact information 422 and a CS MSISDN such as the CS MSISDN 416 in case the session is CS based and is one of multiple sessions belonging to the same IMS user.

In step 506, the STR processor 404 receives an STR 424 from MSC server 425 which is an embodiment of the MSC server 114 of FIG. 1 adapted for including an IMSI (GRUU) in session transfer requests. The STR processor 404 operates to extract from the STR 424 an IMSI 426 used in the CS domain 104 as an identifier for the user device 106, i.e. the IMSI 426 may be stored on an (U)SIM card of user device 106. Specifically, the STR 424 may either directly include the IMSI or may include a GRUU. The STR processor 404 provides the extracted IMSI 426 (or GRUU) to the retrieving component 412.

In step 508, the retrieving component 412 operates to retrieve, based on the received IMSI 426 (or GRUU), a CS MSISDN 428 from HSS 414 (or from another HSS). The retrieving component 412 provides the retrieved CS MSISDN 428 to the comparator 406. The further steps 510 to 514 of comparing the retrieved CS MSISDN 428 with CS MSISDN numbers in session table 402, identifying thereby the session related to the session transfer request 424, and performing the session transfer for the identified session are similar to steps 308 to 312 in FIG. 3.

Figure 6:
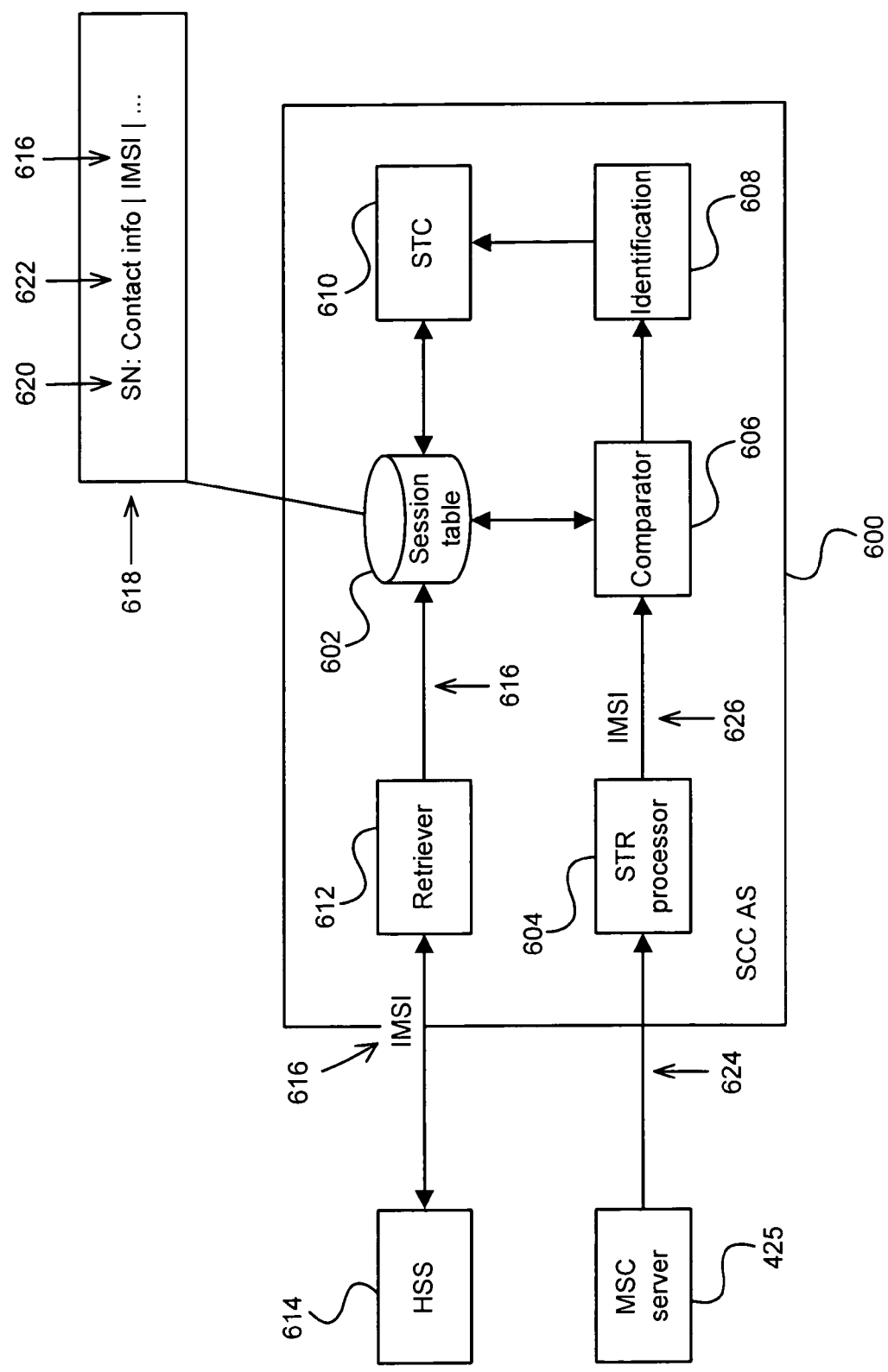
FIG. 6 illustrates functional components of a third embodiment of the SCC AS of FIG. 1.

FIG. 6 schematically illustrates functional components of a third embodiment 600 of the SCC-AS 108 of FIG. 1. The SCC AS 600 comprises a session table 602, STR processor 604, comparator 606, identifier component 608, STC 610 and retrieving component 612.

Figure 7:
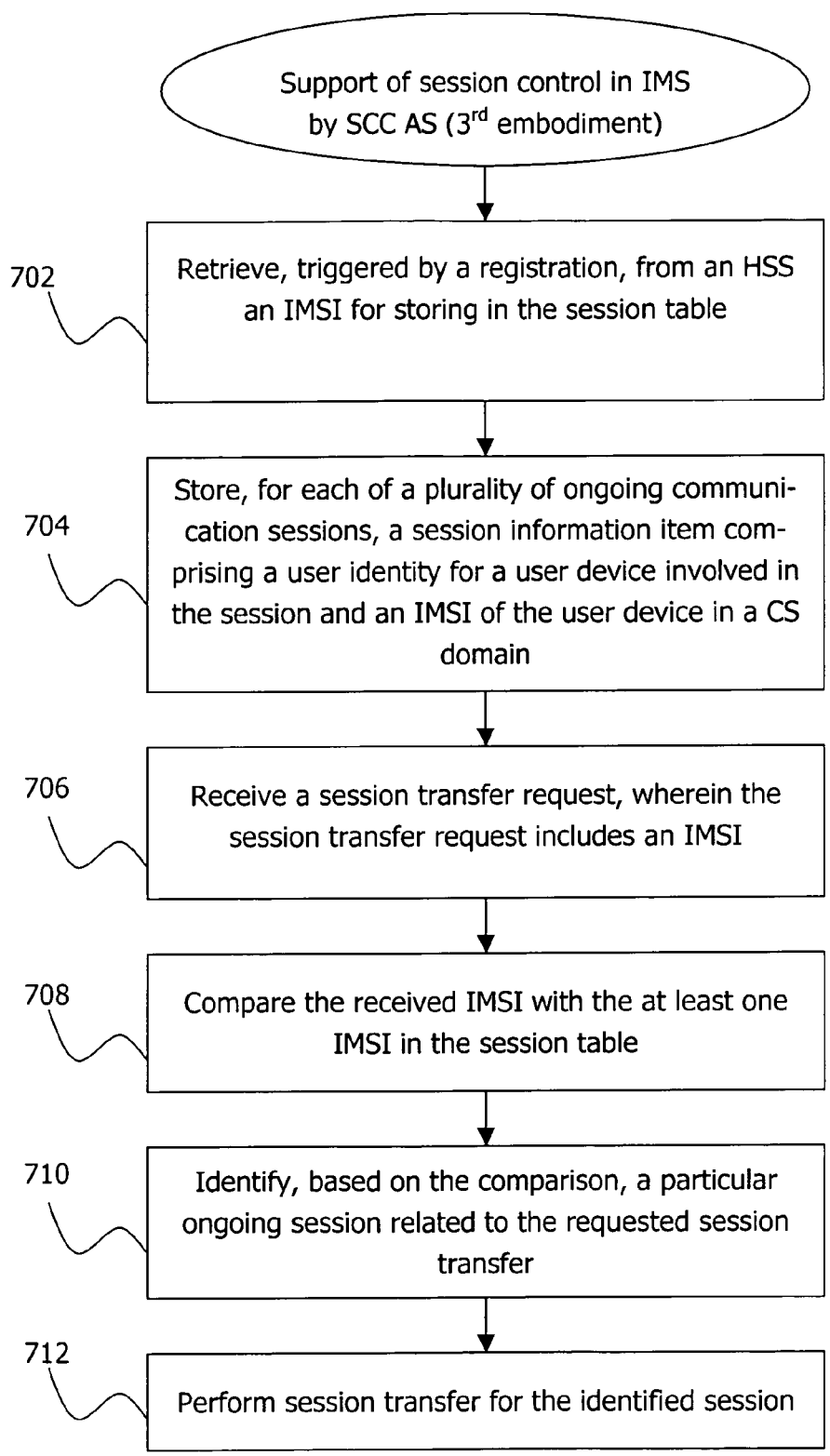
FIG. 7 is a flow diagram illustrating an operation of the SCC AS of FIG. 6.

An operation of the SCC AS 600 will now be described with reference to the flow diagram of FIG. 7. Aspects of the SCC AS 600 not explicitly described below are to be understood as being similar to corresponding aspects of SCC AS 200 of FIG. 2. In step 702, the retrieving component 612 retrieves from an HSS 614 in CS domain 104 an IMSI 616 (or GRUU) of a user device related to an IMS controlled session. The retrieval may, e.g., be triggered by the initiation of the session. The retrieved IMSI 616 is then stored in the session table 602 in step 704. A structure of a session information entry 618 in the session table 602 is illustrated in FIG. 6 as comprising session number 620, a user identity comprising contact information 620, and the received IMSI 616. Further information may also be included in the session information 618. The IMSI may be added to an entry in the session table at least in case a media transport of the session is CS based and there are multiple sessions for the one and the same IMS user identity (IMPU).

In step 706, the STR processor 604 receives a session transfer request 624 from the MSC server 425 already introduced in FIG. 4. The STR message 624 comprises an IMSI 626 (or GRUU) which serves as an indication of the device 106 in the CS domain 104. The STR processor 604 operates to extract the IMSI 626 from the STR 624 and to provide the received IMSI 626 to the comparator 606. In step 708, the comparator 606 compares the received IMSI 626 with IMSIs such as IMSI 616 in the session table 602. Upon a successful match of the received IMSI 626 with one or more IMSIs in session table 602, the identifier component 608 identifies in step 710 the particular ongoing session which is related to the session transfer as requested by the STR 624, for example by providing the corresponding session number SN to the STC 610. Additional decision logic may be implemented in order to identify a particular session among several sessions associated with one and the same IMSI. The decision may be based on criteria which are analogous to those discussed above for the identification component 208 with regard to distinguishing several entries having one and the same CS MSISDN.—In step 712, the SCC 610 performs the requested session transfer for the identified session.

While in the embodiments above it has been mainly described that the CS MSISDN or IMSI is included in the session transfer request, in other embodiments the GRUU (e.g., an InstanceID) is included in a session transfer request. In these embodiments, the user device may directly indicate a GRUU to the SCC AS during registration (via I1 or Gm interface). Instead of or additional to a CS MSISDN and/or IMSI, the GRUU may be stored in the session table in association with a session or multiple sessions belonging to the user device. The identification of a session for session transfer will then be based on matching GRUUs. In one embodiment, an SCC AS is adapted to store either the CS MSISDN or the IMSI/GRUU for a session, depending on whether the MSC server or the user device has performed registration, such that a subsample of session entries in the session table contains MSISDN numbers while another subsample of session entries comprises IMSIs and/or GRUUs.

Figure 8:
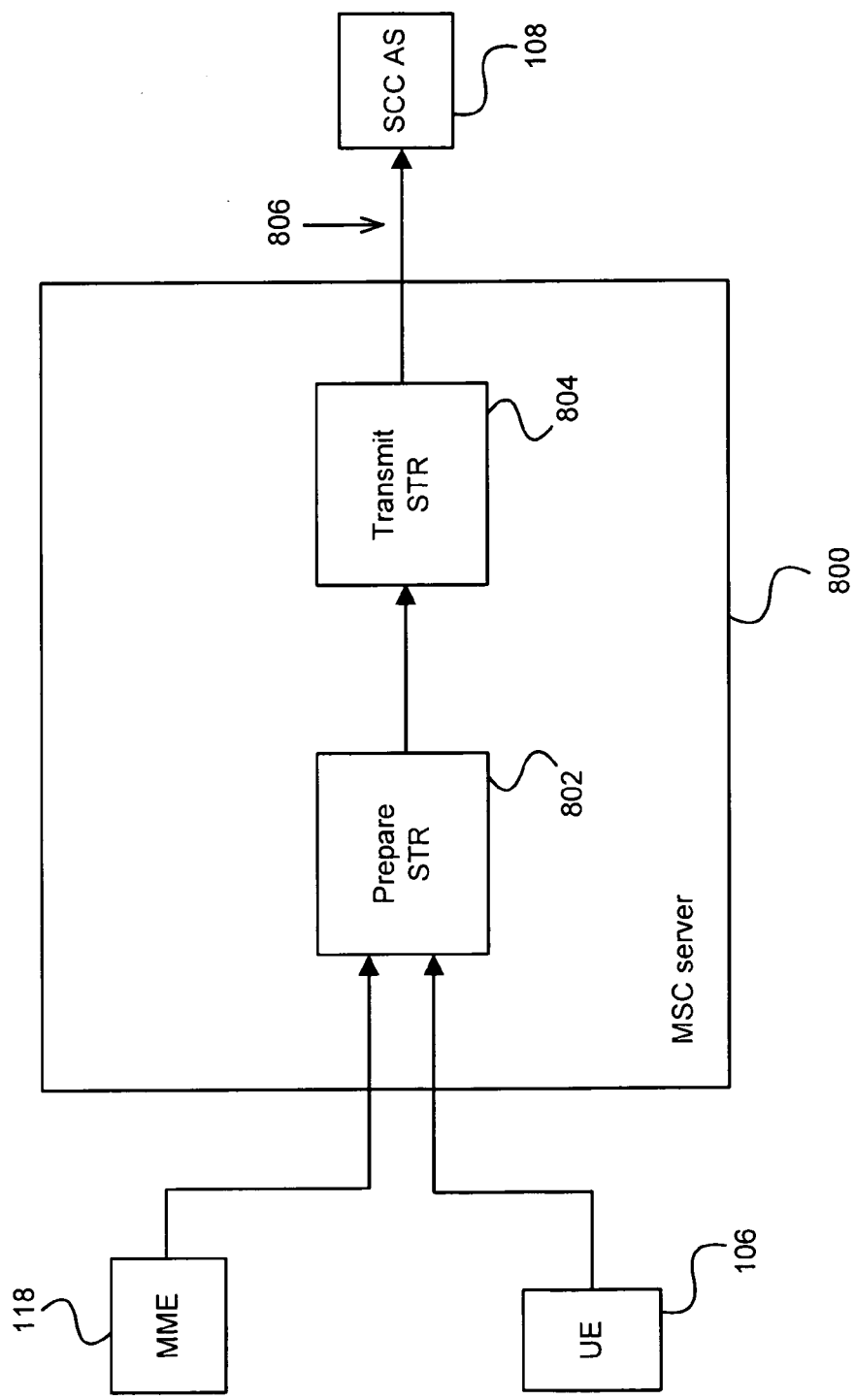
FIG. 8 illustrates functional components of an embodiment of the MSC server of FIG. 1.

FIG. 8 schematically illustrates functional components of an embodiment 800 of the MSC server 114 of FIG. 1. The MSC server 800 comprises a Session Transfer Request (STR) preparation component 802 and an STR transmission component 804.

Figure 9:
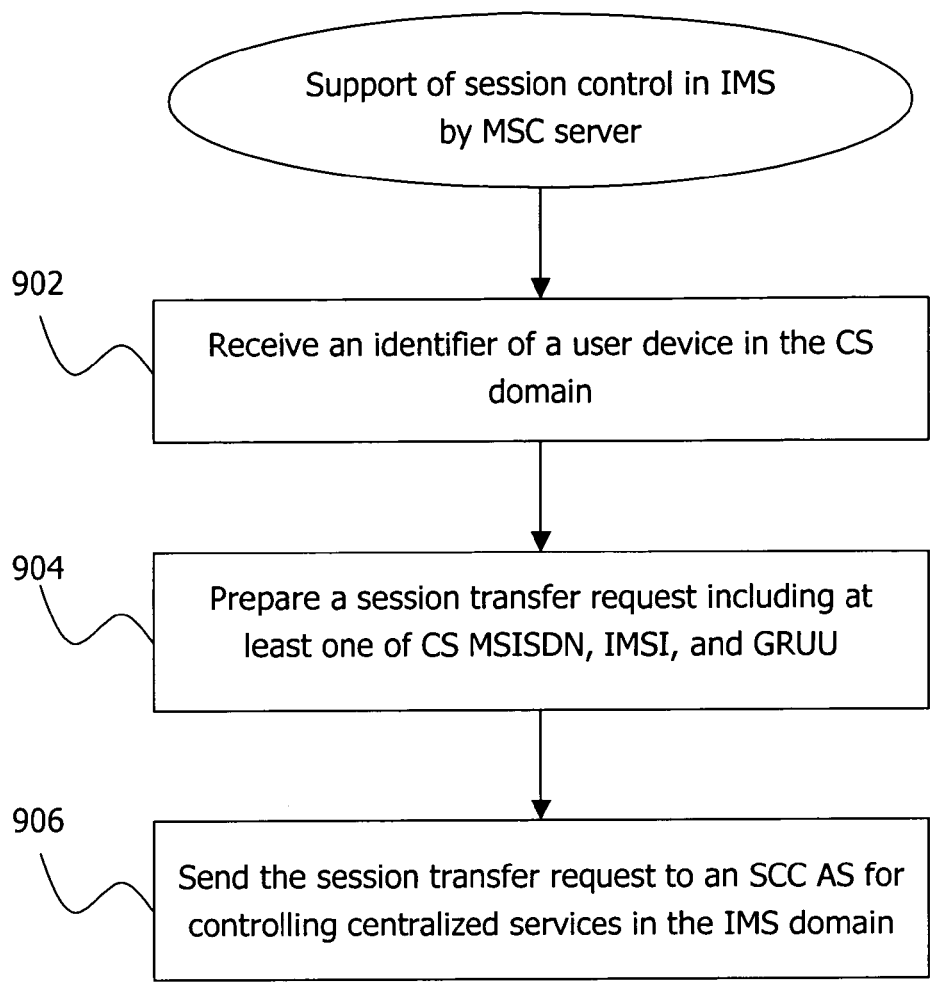
FIG. 9 is a flow diagram illustrating an operation of the MSC server of FIG. 8.

An operation of the MSC server 800 will now be described with reference to the flow diagram of FIG. 9 and the general scenario depicted in FIG. 1. In step 902, an identifier of the user device 106 for use in the CS domain 104 is received, e.g. a CS MSISDN or an IMSI or a GRUU. The identifier may be received based on various mechanisms, which may be conventional mechanisms, for example during a CS attach of the user device 106, a location update, or from the MME 118 (see also FIG. 1), e.g. in a relocation request. In some embodiments, an identifier other than CS MSISDN or IMSI is received and the CS MSISDN or IMSI is retrieved on the basis of this other indication from, e.g., an HSS (not shown in FIG. 8) or similar subscriber register.

In step 904, the STR preparation component 802 prepares a session transfer request including at least one of the CS MSISDN, IMSI and GRUU received or determined in step 902. The operation of the STR preparation component 802 may be triggered by an indication that the user device 106 wants to change from a PS access to a CS access. The indication might be a Handover (HOV) request, or a relocation request received from, e.g., the MME 118. In case of a SIP enabled MSC server 800, the component 802 may construct a SIP INVITE message. Alternatively, the component 802 may be adapted to prepare an ISUP IAM message.

In step 906, the STR transmission component 804 sends the prepared STR message 806 to the SCC AS 108. In case a CS MSISDN is included in the STR, the MSC server 800 behaves as illustrated by embodiment 225 in FIG. 2. In case an IMSI (GRUU) is included in the STR, the MSC server 800 behaves as illustrated by embodiment 425 in FIGS. 4 and 6. As the STR message 806 already includes an identifier of the device to which the session to be transferred is related, there is no necessity for any intermediate control node such as a CSCF to analyse, modify or otherwise process the CS MSISDN or IMSI in the STR message 806, or to include the same or another device identifier into the STR message 806. Therefore, the included device/user indication may be transparently forwarded to the SCC AS 108.

Figure 10:
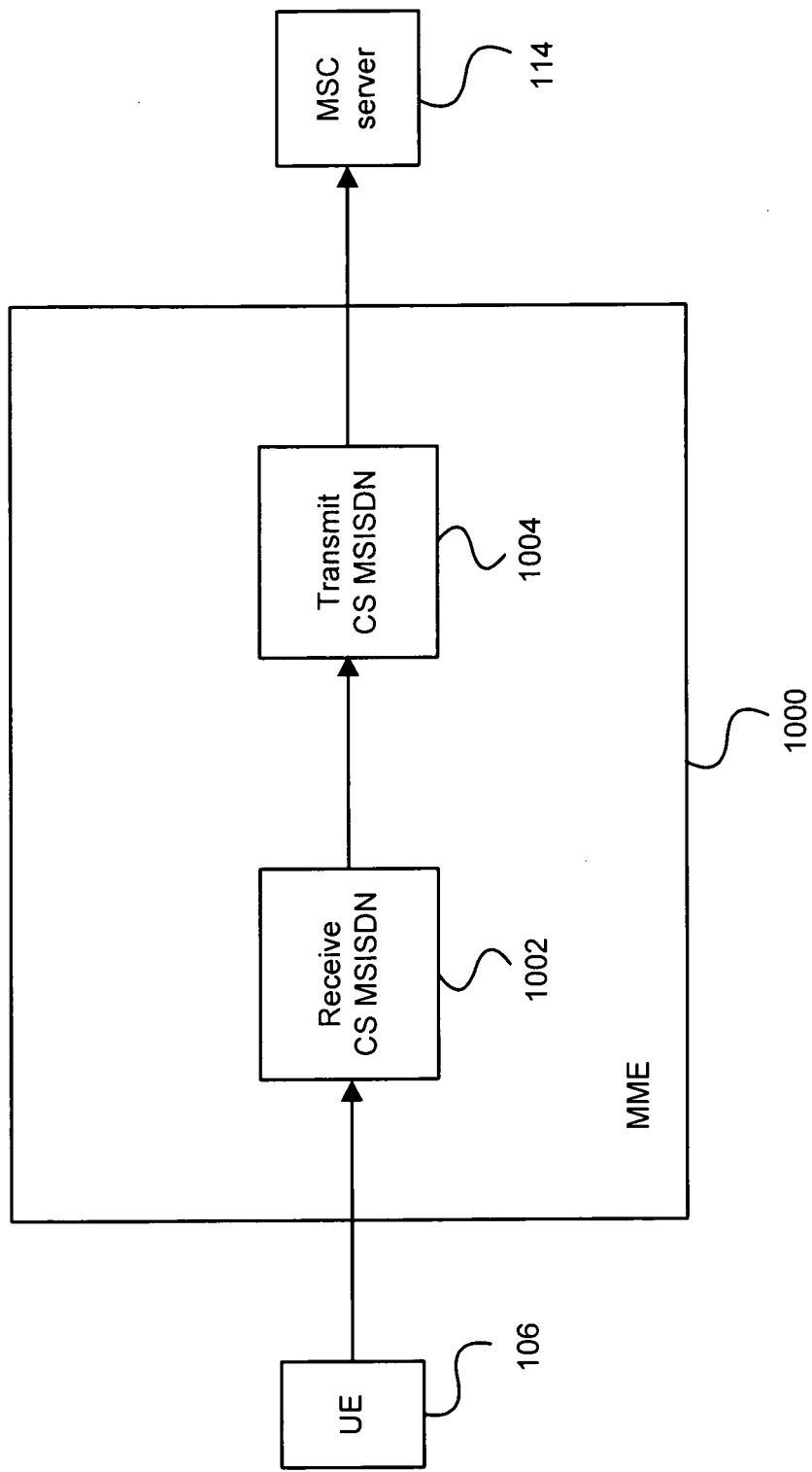
FIG. 10 illustrates functional components of an embodiment of the MME of FIG. 1.
Figure 11:
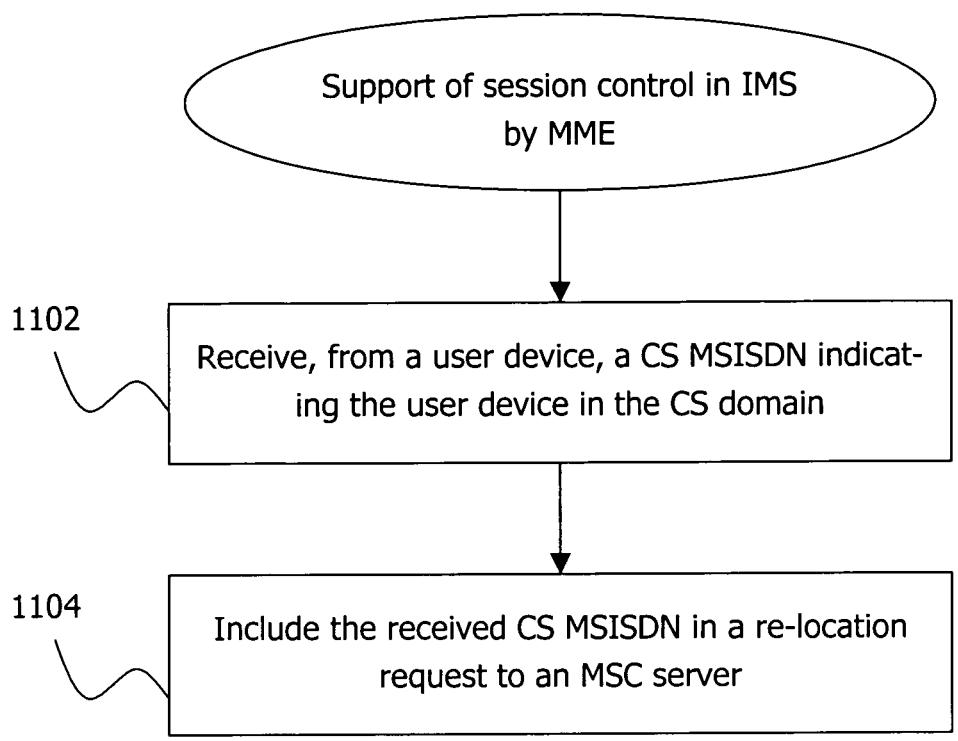
FIG. 11 is a flow diagram illustrating an operation of the MME of FIG. 10.

FIG. 10 schematically illustrates functional components of an embodiment 1000 of the Mobility Management Entity (MME) 118 of FIG. 1. The MME 1000 comprises an identifier reception component 1002 and an identifier transmission component 1004. An operation of the MME 1000 is illustrated in the flow diagram of FIG. 11. In step 1102, the reception component 1002 operates to receive an identifier for the user device 106 in the CS domain 104, e.g., a CS MSISDN, for example during CS attach of the user device 106. In step 1104, the transmission component 1004 operates to include the received CS MSISDN in a relocation request to the MSC server 114.

In other embodiments implemented, for example, in an LTE network, the SGs interface may be used which works to ensure that a user device which is PS attached is automatically also CS attached. In such cases transport of the CS MSISDN in the relocation request towards the MSC server is not required.

Figure 12:
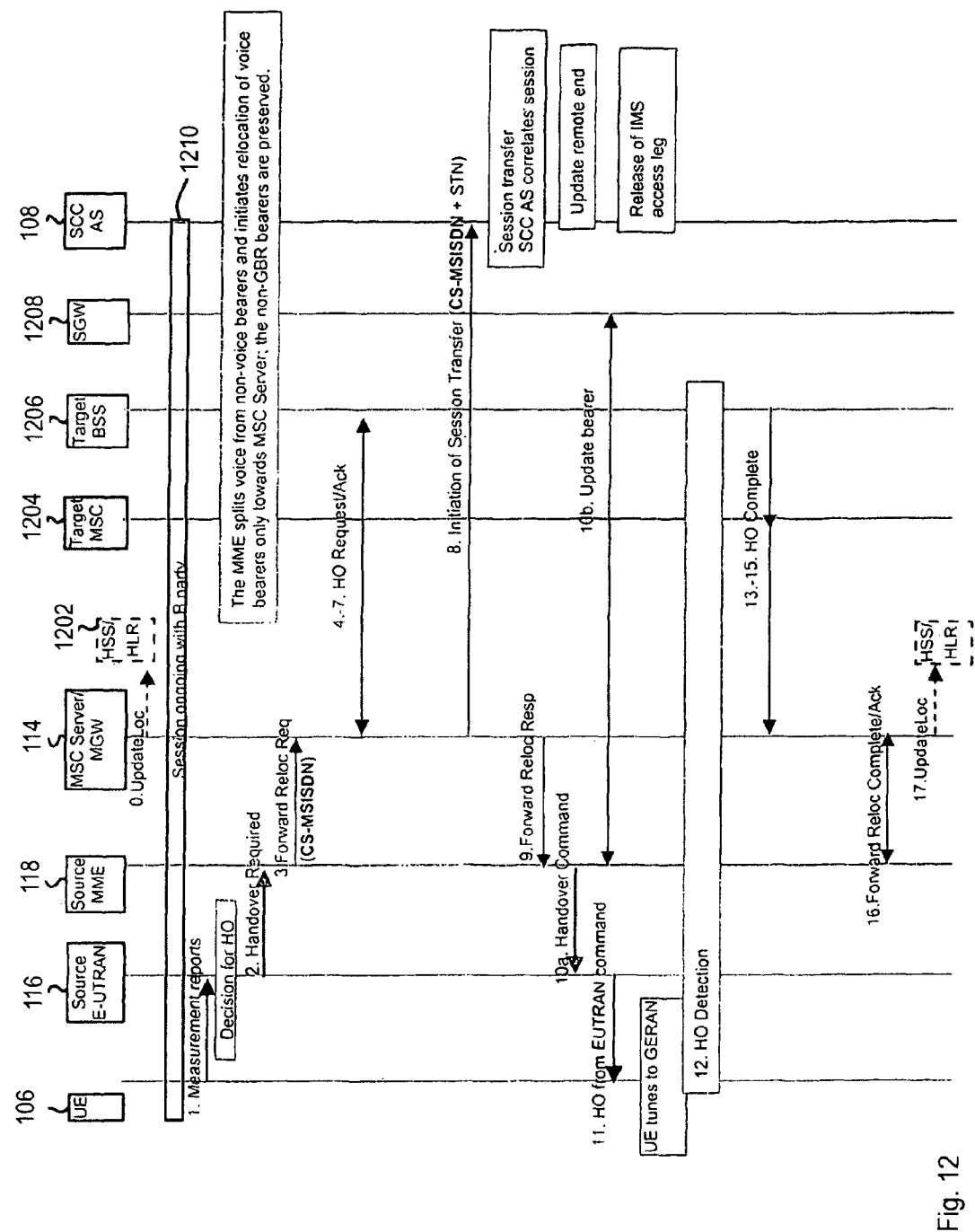
FIG. 12 is a sequence diagram illustrating a message flow in the communications network of FIG. 1.

FIG. 12 illustrates a sequence of messages for supporting a session transfer related to user device 106 into the CS domain 104 in the communications network 100. The entities involved comprise the user device 106, the source E-UTRAN 116, the source MME 118, the MSC server 114, an HSS 1202, a target MSC 1204, a target BSS 1206, a signalling gateway 1208 and the SCC AS 108. While the techniques proposed herein are illustrated in FIG. 12 based on a CS MSISDN, similar considerations apply to embodiments in which an IMSI or GRUU is used. Further, the scenario illustrated in FIG. 12 is based on the SRVCC (Single Radio Voice Call Continuity) feature as specified in the TS 23.216, e.g. the MSC server 114 is assumed to be enhanced for SRVCC. However, the following discussion is in many aspects applicable also for other scenarios such as dual radio cases. As one of these general aspects, in order to allow the SCC AS 108 the identification of the session to be transferred, the CS MSISDN of the user device 106 should not be shared amongst multiple devices in the IMS domain 102.

Before establishment of any session, the user device 106 (in case of being IMS capable) may register directly in IMS or the MSC server 114 may register the user device 106 in IMS. During or after establishment of a session 1210 controlled by the SCC AS 108, the CS MSISDN, i.e. the MSISDN serving as an identifier for the user device 106 in the CS domain 104, has to be available to the SCC AS 108. For example, the SCC AS 108 may retrieve the CS MSISDN from HSS 1202 during initiation of session 1210 and store the CS MSISDN in association with further session-related information (see session tables in the SCC AS embodiments of FIGS. 2 and 4).

In step 0 the MSC server 114 performs a location update prior to establishment of the session 1210. This is one way the MSC server 114 may receive the CS MSISDN of user device 106. The step 0 may be a mandatory step, but is an optional step in the scenario of FIG. 12, as other possibilities exist to let the MSC server know the CS MSISDN. For example, in case the SGs interface is used, the CS MSISDN will be available to the MSC server enhanced for SRVCC. In case SGs is not used, the SC-MSISDN has to be transported to the MSC server 114 as illustrated in steps 1-3 in FIG. 12, i.e. the MSC server 114 alternatively or additionally receives the CS MSISDN from the MME 118. In order to perform a handover from UTRAN 116 towards CS access 112 (cf. FIG. 1) as required according to steps 1 and 2, the MME 118 provides the CS MSISDN of the user device 106 in a forward relocation request to the MSC server 114 in step 3.

The steps 1-3 illustrated in FIG. 12 require that the user device 106 knows its CS MSISDN. The step in which the user device 106 provides the CS MSISDN to the MME 118 during CS attach is not explicitly illustrated in FIG. 12.

In response to the forward relocation request, the MSC server 114 initiates a handover towards the target MSC 1204 and target BSS 1206. The steps 4-7 are described in more detail in the TS 23.216 with reference to FIG. 6.2.2.1-1. In step 8, the MSC server 114 transmits a session transfer request (STR) including the CS MSISDN towards the SCC AS 108. The request may be transmitted as a SIP INVITE message or an ISUP IAM message. In any case, the MSC 114 or an associated Media Gateway Control Function (MGCF) includes the CS MSISDN (more generally, an IMPU based on the CS MSISDN) as the calling party identity (A-number/TEL URI) in the STR.

The MSC server 114 may generally include the CS MSISDN in an INVITE, for example, in case the MSC server 114 is enhanced for ICS. In case the MSC server is not enhanced for ICS, CAMEL would be required to ensure that the A-number is not lost. The SCC AS 108 may then extract the CS-MSISDN (IMPU) from the From field in the STR message.

In step 8, the CSCF 110 (not shown in FIG. 12, see FIG. 1) will forward the STR to the SCC AS 108 based on the user profile for the IMPU related to the CS MSISDN. The CSCF will not change or otherwise process the CS MSISDN or add another indication of the CS MSISDN or IMSI of the user device 106. The SCC AS 108 identifies the session related to the session transfer request received in step 8. This has been described in detail for example with reference to the embodiment 200 of SCC-AS 108 in FIG. 2. Moreover, the SCC AS 108 informs the remote end of the SDP of the new CS access leg, and the PS access leg is released. The further steps 9-17 are explained in more detail in the TS 23.216.

In other embodiments a transport of the CS MSISDN to the MSC server may be omitted. In these embodiments the MSC server includes the IMSI (or GRUU) serving as a user indication for the user device in the CS domain in the session transfer request. For example, the GRUU may be included as a T-IMPU. As one possibility, the SCC AS may then correlate the session transfer request with an ongoing session in a way which has been described above with reference to FIG. 4: The SCC AS retrieves a CS MSISDN from the HSS based on the received IMSI and uses the retrieved CS MSISDN to identify the session. As another possibility, the SCC-AS may proceed as has been described with reference to FIG. 6: The IMSI received in the STR is directly compared to IMSIs in the session information stored in the session table. This requires that the IMSI is stored in the session information at least for sessions which include CS based media transport.

The techniques proposed herein allow the control node for service centralization and continuity in IMS (the SCC AS) to identify the session to be transferred in case a corresponding request is received and the IMS user identity is shared amongst multiple user devices. Employing a device or user indication which is unique at least in the CS domain (such as MSISDN or IMSI) allows identification of the user device and/or session to be transferred. At the same time existing mechanisms for access change and for service centralization and continuity in IMS are re-used to a large extent. This allows to minimize implementation efforts and limits complexity of the communications network.

While the current invention has been described in relation to its preferred embodiments, it is to be understood that this description is for illustrative purposes only. Accordingly, it is intended that the invention be limited only by the scope of the claims appended hereto.

The invention claimed is:

1. A method implemented by a control node for supporting session control in an IP Multimedia Subsystem (IMS) domain of a communications network, wherein the control node is configured to control centralized services and service continuity in the IMS domain, and wherein the method comprises:
storing a session information item for each of a plurality of ongoing communication sessions, the session information item stored for any given session comprising a user identity identifying a user of a user device involved in the session and a first device identifier identifying that user device in a Circuit Switched (CS) domain of the communications network, wherein the user identity is associated with multiple user devices of said user and wherein the first device identifier comprises at least one of a Mobile Subscriber ISDN Number (MSISDN), an International Mobile Subscriber Identity (IMSI), and a Globally Routable Unique User (GRUU) identifier;
receiving a session transfer request that has been transparently forwarded by a call control node in the IMS domain to the control node, the session transfer request requesting transfer of a session associated with a second device identifier included in the request, the second device identifier identifying a user device in the CS domain and comprising at least one of an MSISDN, an IMSI, and a GRUU identifier;
comparing the received second device identifier, or a third device identifier determined based on the second device identifier, with the stored plurality of first device identifiers; and
identifying, based on the comparison, a particular ongoing session to which the received session transfer request relates.

2. The method according to claim 1, wherein the session transfer request is received, via said call control node in the IMS domain, from a control node for CS access control in the CS domain.

3. The method according to claim 2, further comprising processing the received session transfer request to extract the second device identifier, based on a determination that the session transfer request has been received from the control node for CS access control in the CS domain.

4. The method according to claim 1, further comprising retrieving the first device identifier associated with any given session from a subscriber register for storage of a corresponding session information item, responsive to initiation of that session.

5. The method according to claim 1, wherein said identifying comprises selecting one of a plurality of session information items that each comprise the same first device identifier, wherein said selection is based on at least one of selecting the session information item associated with the most recently established session and selecting a session information item associated with a session that includes transport of speech.

6. The method according to claim 1, wherein said comparing comprises comparing the third device identifier with the stored plurality of first device identifiers, and wherein the method further comprises retrieving the third identifier from a subscriber register based on the second identifier.

7. The method according to claim 1, wherein the received second device identifier comprises one of an IMSI and a GRUU identifier and wherein the third identifier comprises an MSISDN.

8. The method according to claim 1, further comprising receiving an indication regarding which of an MSISDN, an IMSI, and a GRUU identifier is to be used for identifying the session to be transferred.

9. The method according to claim 1, wherein said identifying comprises determining a session number for the particular ongoing session associated with a stored session information item that includes a first device identifier that matches the received second device identifier, or that matches the third device identifier derived therefrom.

10. A computer program product stored on a non-transitory computer readable medium and comprising program code portions that, when executed on one or more computing devices associated with a control node configured to control centralized services and service continuity in an IP Multimedia Subsystem (IMS) domain of a communications network, cause the control node to support session control in the IMS domain, the program code portions causing the control node to:
store a session information item for each of a plurality of ongoing communication sessions, the session information item stored for any given session comprising a user identity identifying a user of a user device involved in the session and a first device identifier identifying that user device in a Circuit Switched (CS) domain of the communications network, wherein the user identity is associated with multiple user devices of said user and wherein the first device identifier comprises at least one of a Mobile Subscriber ISDN Number (MSISDN), an International Mobile Subscriber Identity (IMSI), and a Globally Routable Unique User (GRUU) identifier;

receive a session transfer request that has been transparently forwarded by a call control node in the IMS domain to the control node, the session transfer request requesting transfer of a session associated with a second device identifier included in the request, the second device identifier identifying a user device in the CS domain and comprising at least one of an MSISDN, an IMSI, and a GRUU identifier;

compare the received second device identifier, or a third device identifier determined based on the second device identifier, with the stored plurality of first device identifiers; and identify, based on the comparison, a particular ongoing session to which the received session transfer request relates.

11. A control node for controlling centralized services and service continuity in an IP Multimedia Subsystem (IMS) domain of a communications network, the control node configured to support session control in the IMS domain and comprising:

a memory configured to store a session information item for each of a plurality of ongoing communication sessions, the session information item stored for any given session comprising a user identity identifying a user of a user device involved in the session and a first device identifier identifying that user device in a Circuit Switched (CS) domain of the communications network, wherein the user identity is associated with multiple user devices of said user and wherein the first device identifier comprises at least one of a Mobile Subscriber ISDN Number (MSISDN), an International Mobile Subscriber Identity (IMSI), and a Globally Routable Unique User (GRUU) identifier;

a session transfer request processor configured to receive a session transfer request that has been transparently forwarded by a call control node in the IMS domain to the control node, the session transfer request requesting transfer of a session associated with a second device identifier included in the request, the second device identifier identifying a user device in the CS domain and comprising at least one of an MSISDN, an IMSI, and a GRUU identifier;

a comparator configured to compare the received second device identifier, or a third device identifier determined based on the second device identifier, with the stored plurality of first device identifiers; and an identification circuit configured to identify, based on the comparison, a particular ongoing session to which the received session transfer request relates.

12. The control node of claim 11, wherein the session transfer request processor is configured to receive the session transfer request, via said call control node in the IMS domain, from a control node for CS access control in the CS domain.

13. The control node of claim 12, wherein the session transfer request processor is configured to process the received session transfer request to extract the second device identifier, based on a determination that the session transfer request has been received from the control node for CS access control in the CS domain.

14. The control node of claim 11, further comprising a retriever configured to retrieve the first device identifier associated with any given session from a subscriber register for storage of a corresponding session information item, responsive to initiation of that session.

15. The control node of claim 11, wherein the identification circuit is configured to identify said particular ongoing session by selecting one of a plurality of session information items that each comprise the same first device identifier, wherein said selection is based on at least one of selecting the session information item associated with the most recently established session and selecting a session information item associated with a session that includes transport of speech.

16. The control node of claim 11, wherein the comparator is configured to compare the third device identifier with the stored plurality of first device identifiers, and wherein the control node further comprises a retriever configured to retrieve the third identifier from a subscriber register based on the second identifier.

17. The control node of claim 11, wherein the received second device identifier comprises one of an IMSI and a GRUU identifier and wherein the third identifier comprises an MSISDN.

18. A control node for Circuit Switched (CS) access control in a CS domain of a communications network, the control node configured to support session control in an IP Multimedia Subsystem (IMS) domain of the communications network and comprising:

a session transfer request preparation circuit configured to prepare a session transfer request comprising an identifier identifying a user device in the CS domain, wherein the identifier comprises at least one of a Mobile Subscriber ISDN Number (MSISDN), an International Mobile Subscriber Identity (IMSI), and a Globally Routable Unique User (GRUU) identifier;

a session transfer request transmission circuit configured to send the session transfer request to a control node for controlling centralized services in the IMS domain; and wherein the session transfer request transmission circuit is configured to transparently send the session transfer request to the control node for controlling centralized services in the IMS domain via a call control node in the IMS domain.

19. The control node of claim 18, wherein the session transfer request preparation circuit is configured to include the MSISDN as said identifier if the session transfer request is to be transmitted to the control node for controlling centralized services in the IMS domain via an I2 interface.

* * * * *